United States Patent Office 3,477,879
Patented Nov. 11, 1969

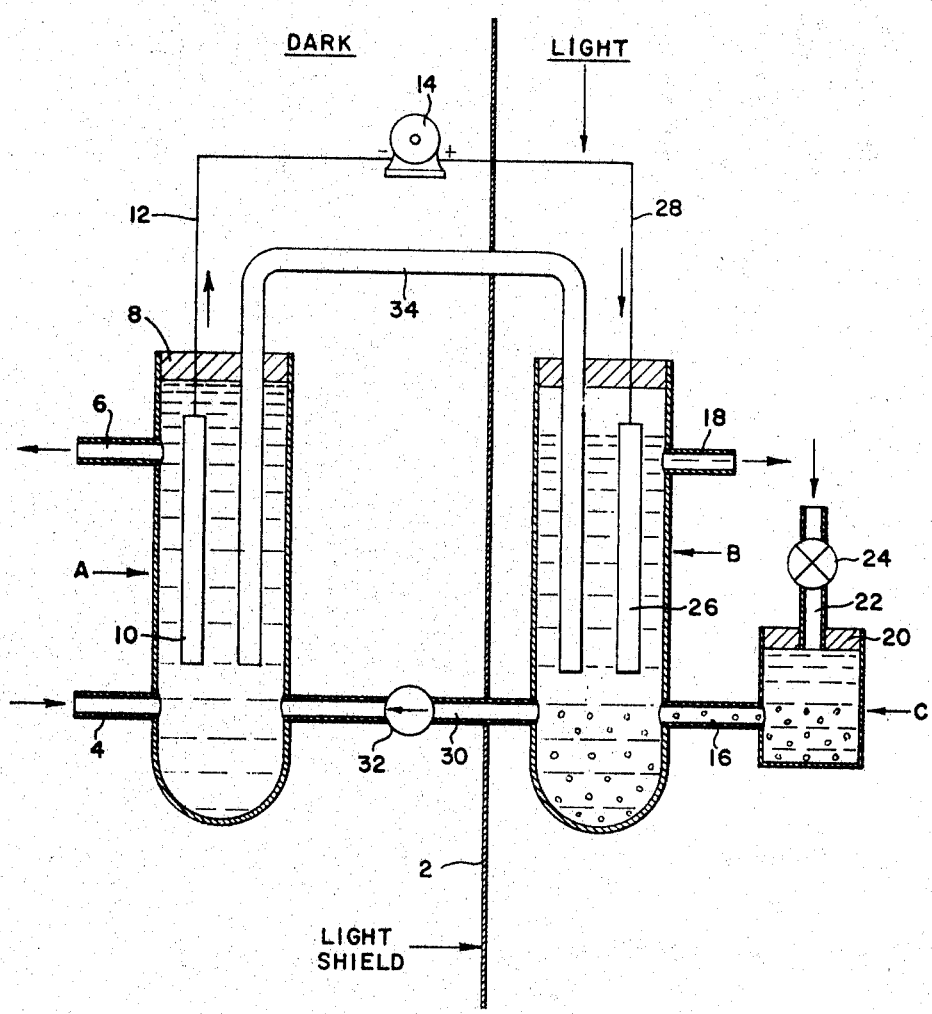

3,477,879
BIOCHEMICAL FUEL CELL
Frederick D. Sisler, Bethesda, Md.
(5003 Wapakoneta Road, Washington, D.C. 20016)
Continuation-in-part of application Ser. No. 262,993,
Mar. 5, 1963. This application Dec. 28, 1966, Ser.
No. 605,378
Int. Cl. H01m 27/24; C12b 3/12; H02n 11/00
U.S. Cl. 136—86                                3 Claims

ABSTRACT OF THE DISCLOSURE

A biochemical fuel cell for producing electrical energy in an external circuit, having a positive chamber which is subjected to light and in which living photosynthetic microorganisms such as algae are grown in a liquid medium and from which the photosynthetic microorganisms, after death, are supplied as food for non-photosynthetic bacteria in a liquid medium in a negative chamber which is shielded from light, the liquid media in the chambers being kept from mixing and being separated by ion-diffusion material, a non-corrosive electrode in each chamber, respectively, being connected externally of the chambers to an electric load.

Cross references to related applications

This application is a continuation-in-part of co-pending application Ser. No. 262,993, filed Mar. 5, 1963, now abandoned, for Biochemical Fuel Cell, which was a division of application Ser. No. 167,080, filed Jan. 18, 1962, now abandoned, for Biochemical Fuel Cell.

Brief description of the invention

The object of the invention has been to provide an apparatus for converting a continuous supply of light energy to a continuous supply of electrical energy. This is accomplished by providing a biochemical fuel cell having two chambers which are separated by ion-diffusion material so that the liquid media in the two chambers do not mix, while passage of ions between them is permitted. Live photosynthetic microorganisms are introduced into the liquid medium in one chamber, the positive chamber, and are subjected to a constant source of light, while live non-photosynthetic bacteria, such as Desulfovibrio, are introduced into the liquid medium in the other chamber, the negative chamber, which is shielded from light. Non-corrosive electrodes in the two chambers are connected to an external circuit and produce a steady electric current therein. In order to produce continuous operation there are provided means for continually introducing into both chambers fresh aqueous media containing nutrients and minerals for the microorganisms of the respective chambers, and means for removing from each chamber the undesirable by-products resulting from metabolic processes.

Description of the drawings

The single figure of the drawings is a schematic view of a biochemical fuel cell according to the invention.

Detailed description of the invention

The invention provides a biochemical fuel cell for converting solar or light energy (photons) to electrical energy (electrons). The basic principle behind this invention is the provision of practical and useful means to harness an energy conversion process or mechanism, the rudiments of which are extant in nature. For example, in the oceans solar or light energy is utilized by algae and other photosynthetic organisms to convert carbon dioxide and water into, essentially, a carbohydrate. The carbohydrate is a fixed form of chemical energy and is used by living organisms as a source of fuel for their metabolism, which in turn provides for growth, activity and other processes necessary for life. Algae provide the basic food for all the animals and fish in the sea, and the process of converting light energy into chemical energy by algae is called primary productivity. Ultimately, the chemical energy produced by the algae is finally released by bacteria and other non-photosynthetic microorganisms and converted essentially to heat energy. The bacteria may feed directly on dead and decomposed algae, or on dead and decomposed fish and animals in the sea which have used algae directly or indirectly as a source of food. In addition to heat energy, bacteria and other microorganisms produce reduced chemical compounds which are in a low oxidation state. Such compounds have a surplus of electrons, and the reduced compounds will give up their electrons if they come in contact with compounds of a high oxidation state. The result will then be electrical neutralization and heat. The energy process so far described is light energy to chemical energy to heat energy. If, in nature, in the sea for example, the reduced compounds containing an excess of electrons and the oxidized compounds containing a deficiency of electrons remain separated no electron exchange or electrical neutralization takes place. Under these conditions an electric potential difference exists between the two types of compounds, which is tantamount to saying that a potential source of electrical energy is available.

A common phenomenon in ocean and estuarine environments where circulation is poor is the formation of hydrogen sulfide through the activities of anaerobic sulfate-reducing bacteria, largely represented by the genus Desulfovibrio. Sulfate, the second most abundant anion in sea water, is used by the anaerobic sulfate-reducing bacteria as an oxidant for oxidation of organic matter or hydrogen gas, this reaction furnishing the energy for cell metabolism. Sulfate is reduced to sulfide, and in the first oxidation step of the sulfide ion it appears that two electrons are released and migrate toward the sea surface, which acts as the cathode. Here the electrons combine with molecular oxygen and water to form hydroxyl ions, the surface waters becoming slightly more alkaline, while the superficial sediments tend toward an acid pH. Eventually excess hydroxyl ions in the euphotic zone of the ocean combine with hydrogen ions generated in the sediments or bottom water. Once hydrogen sulfide is released into the medium by the sulfate-reducing bacteria, the remaining processes are electrochemical in nature and require no biological catalysts. Thus biological and electrochemical processes in the sea combine to provide a natural fuel cell, and a flow of electrical current is made available for geochemical work.

Many of the geochemical processes taking place on the sea floor are oxidation-reduction reactions involving the gain or loss of electrons. Free ions which are capable of reduction could serve as electron traps. For example, in a natural biochemical fuel cell system, as described above, functioning in an environment where there is a continuous fresh source of ferric ion, such as would occur at the delta of a river, we may expect the following to occur:

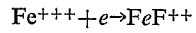

In the presence of $H_2S$ ferrous sulfide may precipitate. This might eventually lead to the formation of pyrite or marcasite. The precipitation, solution or diagenesis of calcium carbonate, dolomite, silicates, phosphate, manganese and other minerals in the sea may be considerably influenced by the existence of a natural chemical fuel cell system. Both organic and inorganic matter may serve as electron traps. Since sea water is an excellent electrolyte, while fresh water is usually a poor conductor, we should expect the biochemical fuel cell to opearte more efficiently in the marine environment.

It has been the principal object of this invention to provide a biochemical fuel cell which will be economically useful to generate electricity, either alone or in connection with other cells. In this invention I have made use of the phenomena which I have observed taking place in nature, which are described above, but it is to be understood that I have not merely transferred to the laboratory or to the electrical generating station the elements, components and reactions of such natural phenomena. In fact, such elements, components and reactions, if so transplanted, would not generate electricity in the laboratory or generating station because of the absence there of phenomena and stimuli present only in nature. Moreover, while electric currents may be generated in a marine environment, they are entirely randomly dispersed and can only be detected by scientific means and cannot be harnessed without the use of special equipment. My invention therefore is a carrying forward of such natural phenomena, involving the rearrangement and amplification of its elements, components and reactions and the addition thereto of parts, all resulting in the provision of commercially useful means for generating electrical energy.

In carrying out my invention and achieving its objects I have, as stated above, utilized microorganisms in an electricity-generating fuel cell to speed the chemical reaction in the cell, and to utilize organic matter produced from light energy as a source of fuel resulting in increased generation of electrical energy by the cell. By this invention I have provided a fuel cell having new arrangement and components and being so operative that it will not only generate electricity but will also be responsive to the catalytic effect of microorganisms to increase greatly the generation of electricity.

The microorganisms which are useful in the practice of the invention are small, single-cell, free-living organisms and include bacteria, all yeasts, all single-cell molds, single-cell algae and the like, together with all of their enzymes which are involved in the fermentation process of the cell. All of these, so defined, are included within the scope of this invention and are referred to in the specification and claims as microorganisms.

If a mechanism could be provided having a conductor to allow passage of electrons from the reduced to the oxidized compounds, also providing an ion-exchange or diffusion membrane or bridge allowing the exchange of hydrogen and hydroxyl ions, but at the same time preventing the intermixing of the reduced and oxidized compounds, and also providing electrodes at both ends of the conductor to accumulate and disperse the electrons and provide a site for ionization, the potential electric energy of nature, such as that of the ocean, could be converted to kinetic, or useful, electric energy. In nature, in the sea for example, there is no provision of such electric energy generating means, and this invention provides such means to convert light energy to useful electric energy. Instead of the energy conversion process extant in nature: light energy to chemical energy to heat energy, the invention provides the energy conversion process: light energy to chemical energy to electric energy.

The biochemical fuel cell according to the invention and illustrated in the drawings comprises a negative chamber A containing bacteria or other non-photosynthetic microorganisms, this chamber being shielded from light by opaque shielding 2, and having inlet and output ports 4, 6 to provide for introduction of water, minerals, nutrients, non-photosynthetic microorganisms and for removal of by-products. An air seal 8 at the top of chamber A prevents introduction of air into the chamber. A non-corrosive electrode 10 is immersed in the liquid medium in cell A and is connected by lead 12 to the negative terminal of an external load 14. The cell also comprises a chamber B containing algae or other photosynthetic microorganisms, this chamber being subjected to the impingment of light to permit light to irradiate the algae in the chamber. An auxiliary chamber C in which photosynthetic microorganisms, such as live algae, are grown is connected to chamber B by conduit 16 to permit water, minerals, nuetrients, oxygen and photosynthetic morcorganisms to be introduced into chamber B, and a discharge port 18 is provided to permit removal of by-products from the chamber. The chamber is provided with an upper air seal 20 through which there extends an inlet port 22 having valve 24 for the introduction of water, minerals, nutrients, oxygen and photosynthetic microorganisms into chamber B. A non-corrosive electrode 26 is immersed in the liquid medium in chamber B and is connected by lead 28 to the positive terminal of external load 14. A conduit 30 connects the lower parts of chambers A and B and includes a pump and valve assembly 32 which provides for intermittent or continuous pumping of dead algae from chamber B into chamber A, but prevents any material from chamber A entering chamber B. An ion-diffusion bridge 34 connects chambers A and B and permits the flow of hydrogen ions and hydroxyl ions in either direction, but prevents any mixing of the chemical compounds in the two chambers. The ion-diffusion bridge may contain an electrolyte such as potassium chloride (KCl) to provide a carrier for electrically charged paricles such as hydrogen ions and hydroxyl ions.

The inlet port of each chamber is provided in order to permit continuous introduction into each chamber of the aqueous medium, microorganisms, nutrients and minerals for the chamber, and the outlet port of each chamber is provided in order to permit continuous removal from each chamber of the undesirable products of metabolism. These means, together with the continuous source of light energy, produce and permit the continuous production of electrical energy by the cell.

In the operation of the biochemical fuel cell of the invention algae are introduced into positive chamber B and auxiliary chamber C together with water medium containing salts and minerals. The algae are irradiated with light and produce free oxygen, which is liberated, and carbohydrate and other organic compounds which are retained in their bodies. When the algae die they settle to the bottom, or in some cases may temporarily rise to surface if ballooned up by oxygen bubbles. In either case they form a cluster or mass which can be pumped into negative chamber A through conduit 30. When the dead algae reach negative chamber A they decompose and release carbohydrate and other food materials which are utilized and fermented by bacteria and other non-photosynthetic microorganisms, thus providing means for growth of the bacteria. The bacteria in turn release hydrogen or reduced compounds, or both, which are electron rich. The reduced compounds release their electrons to the negative electrode 10 where they flow from chamber A through load 14 to the positive electrode 26 of chamber B. The oxygen in chamber B combines with water and electrons to form hydroxyl ions ($OH^-$). The hydrogen or reduced compounds in chamber A, when they yield electrons, form hydrogen ions ($H^+$). The hydroxyl ions from chamber B and the hydrogen ions from chamber A move through the ion-diffusion bridge and unite to form water. This completes the circuit and useful electrical current is available at load 14. By providing continuous light to chambers B and C, and occasional minerals and nutrients in water to both chambers, a continuous supply of electrical current is produced.

The nutrients for either cell may be such useless materials as raw sewage or industrial wastes.

The biochemical fuel cell described above and as provided by the invention differs, as a source of electric energy from a battery by reason of the fact that its life is continuous and indefinite while that of a battery is not. Thus, the cell of the invention converts the energy of an indefinitely continuous source of light to an indefinitely continuous supply of electricity, and will continue to do so long as the described conditions of the apparatus are maintained. It will be understood that the word "continuous" as used in describing the source of light means either a steady continuous source or an intermittent (i.e. flashing or blinking) source.

I claim:

1. Apparatus for converting an external continuous supply of photons into a continuous supply of electric energy, comprising a positive half cell containing an electrolyte consisting of an aqueous medium including the minerals which are found in sea water including sulfate and having in it live and dead, algae, the live algae providing means for generating oxygen in the positive cell, a negative half cell containing an electrolyte consisting of an aqueous medium including the minerals which are found in sea water including sulfate and having in it bacteria which convert the sulfate to sulfide and to which the dead algae of the positive cell are nutritious, means for supplying dead algae from the positive cell to the negative cell to provide nutrition to the bacteria therein, the positive and negative cells being separated by ion-diffusion means which prevent mixing of the contents of the two half cells, the positive half cell being subjected to the continuous impingement of light and the negative half cell being shielded from light, a non-corrosive electrode immersed in the electrolyte in each half cell, and an external electrical circuit connected to said electrode.

2. Apparatus in accordance with claim 1, in which the microorganisms in the negative chamber are anaerobic, sulfate-reducing microorganisms such as desulfovibrio.

3. Apparatus in accordance with claim 1, comprising in addition means for continuously introducing into each half cell aqueous medium containing microorganisms, nutrients and minerals, and means for continuously removing from each half cell undesirable products of metabolism.

References Cited

UNITED STATES PATENTS

| | | | |
|---|---|---|---|
| 3,228,799 | 1/1966 | Rohrback | 136—100 |
| 3,331,848 | 7/1967 | Davis et al. | 136—86 |

OTHER REFERENCES

Popular Science, January 1962, p. 29.

Transactions of the Foraday Society, vol. 56, 1960, pp. 1689–1696.

Fundamentals of Microbiology, Frobesher, 1957, pp. 379–383.

WINSTON A. DOUGLAS, Primary Examiner

H. FEELEY, Assistant Examiner